(12) United States Patent
Ina et al.

(10) Patent No.: US 7,520,375 B2
(45) Date of Patent: Apr. 21, 2009

(54) BILL HANDLING MACHINE

(75) Inventors: Toshihiko Ina, Owariasahi (JP); Minoru Kadowaki, Toyota (JP); Kunihisa Matsuura, Aichi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/743,305

(22) Filed: Dec. 23, 2003

(65) Prior Publication Data

US 2004/0182678 A1    Sep. 23, 2004

(30) Foreign Application Priority Data

Feb. 6, 2003    (JP) .............................. 2003-029075

(51) Int. Cl.
*G07D 7/00* (2006.01)
*G07G 5/00* (2006.01)

(52) U.S. Cl. ....................... 194/350; 194/217; 194/302; 209/534; 705/24

(58) Field of Classification Search ................ 194/350, 194/206, 215–217, 302; 209/534; 235/379
See application file for complete search history.

(56) References Cited

U.S. PATENT DOCUMENTS

| | | | | | |
|---|---|---|---|---|---|
| 4,736,852 | A | * | 4/1988 | Edin et al. ................... | 209/534 |
| 5,313,050 | A | * | 5/1994 | Hiroki et al. ................. | 235/379 |
| 5,718,318 | A | * | 2/1998 | Wachter ...................... | 194/206 |
| 6,021,883 | A | | 2/2000 | Casanova et al. | |
| 6,128,402 | A | * | 10/2000 | Jones et al. .................. | 382/135 |
| 6,422,458 | B1 | * | 7/2002 | Katou et al. ................. | 235/379 |
| 6,474,549 | B2 | * | 11/2002 | Katou et al. ................. | 235/379 |
| 6,481,620 | B1 | * | 11/2002 | Katou et al. ................. | 235/379 |
| 6,598,726 | B1 | * | 7/2003 | Lundblad et al. ............ | 194/206 |
| 6,749,053 | B2 | * | 6/2004 | Ikuta .......................... | 194/206 |
| 6,843,418 | B2 | * | 1/2005 | Jones et al. ............ | 235/462.01 |
| 6,983,880 | B2 | * | 1/2006 | Graef et al. ................. | 235/379 |
| 7,187,795 | B2 | * | 3/2007 | Jones et al. ................. | 382/135 |
| 7,222,782 | B2 | * | 5/2007 | Lute et al. ................... | 235/379 |
| 2002/0001393 | A1 | | 1/2002 | Jones et al. | |

(Continued)

FOREIGN PATENT DOCUMENTS

JP    53-83686    7/1978

(Continued)

*Primary Examiner*—Patrick Mackey
*Assistant Examiner*—Mark Beauchaine
(74) *Attorney, Agent, or Firm*—McDermott Will & Emery LLP

(57) ABSTRACT

The banknote handling device of the invention notifies both a customer and a clerk at a financial institution of the occurrence of a counterfeit problem in the course of a transaction. When banknotes received from a customer include any counterfeit banknote, the banknote handling device collects the counterfeit banknotes to be not returnable to the customer. This desirably forbids circulation of the counterfeit banknotes. The occurrence of the counterfeit problem is described in a transaction statement on conclusion of the transaction. The transaction statement includes a transaction date/time, customer information, transaction details, a message, and financial institution information. The transaction details show the total amount of money received from the customer, the amount of money accepted for the transaction, that is, the amount of banknotes excluding the counterfeits, and the breakdown of the banknotes accepted for the transaction. The message suggests the customer a step to be taken. This arrangement conveniently and efficiently helps the customer and the clerk take prompt action on the counterfeit problem.

7 Claims, 11 Drawing Sheets

U.S. PATENT DOCUMENTS

| | | | |
|---|---|---|---|
| 2004/0003980 A1* | 1/2004 | Hallowell et al. | 194/206 |
| 2004/0028266 A1* | 2/2004 | Jones et al. | 382/135 |
| 2004/0153408 A1* | 8/2004 | Jones et al. | 705/43 |
| 2006/0010071 A1* | 1/2006 | Jones et al. | 705/42 |

FOREIGN PATENT DOCUMENTS

| | | |
|---|---|---|
| JP | 58 083686 | 7/1978 |
| JP | 9-69178 | 3/1997 |
| JP | 2000-172946 A | 6/2000 |
| JP | 2001 143120 | 5/2001 |
| JP | 2001-143120 | 5/2001 |
| JP | 2002-197505 | 7/2002 |
| WO | WO 00/23952 | 4/2000 |
| WO | WO 00/23952 A1 * | 4/2000 |
| WO | WO 01/91064 A1 | 11/2001 |

* cited by examiner

BILL HANDLING MACHINE

BACKGROUND OF THE INVENTION

The present invention relates to a banknote handling device that handles various transactions including deposits and withdrawals of banknotes.

Banknote handling devices are used in various financial institutions to receive and give banknotes from and to customers. A proposed banknote handling device carries out counterfeit detection to determine each banknote received for a transaction as genuine or as counterfeit and prints out a result of the counterfeit detection of the banknotes used for the transaction while returning the banknotes determined as counterfeit to the customer (see JP53-83686A). When banknotes received from a customer for a transaction include a preset or greater number of banknotes determined as counterfeit, another proposed banknote handling device takes all the received banknotes in a banknote storage box, as well as a passbook and a card used for the transaction (see JP2001-143120A).

SUMMARY OF THE INVENTION

The technique disclosed in JP53-83686A, however, returns the banknotes determined as counterfeit to the customer and allows the customer to try again to use the counterfeit banknotes at another place. Namely this prior art technique does not sufficiently forbid circulation of the counterfeit banknotes. The technique disclosed in JP2001-143120A collects the counterfeit banknotes, as well as the passbook and the card used for the transaction to identify the customer who has possessed and tried to use the counterfeit banknotes for the transaction. This prior art technique, however, bewilders and embarrasses a bona-fide customer, who does not know the possession of any counterfeit banknote and unintentionally uses the counterfeit banknotes, since the transaction is halted without any adequate notification and the passbook and the card are forcibly taken.

In order to eliminate at least part of these drawbacks of these prior art techniques, a first application of the invention is directed to a banknote handling device, which includes: a money-in module that receives banknotes from a customer; a collection box that stores counterfeit banknotes to be not returnable to the customer; a discrimination module that carries out counterfeit detection and determines each banknote as counterfeit or as genuine; a counterfeit processing module that stores each banknote determined as counterfeit into the collection box, based on a result of the counterfeit detection; and a notification module that notifies the customer of predetermined kind of information for specifying a total amount of money received from the customer, regardless of the result of the counterfeit detection.

The 'predetermined kind of information for specifying the total amount of money received from the customer' may notify the customer of only the total amount of banknotes received or may notify the customer of numbers of respective types of banknotes, which enables specification of the total amount of money received. Any piece of information may be used, as long as the total amount of money is specifiable.

The arrangement of the invention collects the counterfeit banknotes to be not returnable to the customer, thus effectively forbidding circulation of the counterfeit banknotes. The arrangement also conveniently notifies the customer of the total amount of money paid in.

In the banknote handling device of the invention, the information may include a number of each type of the banknotes received from the customer. The customer can thus conveniently check the breakdown of the banknotes paid in.

The information may also include a specific piece of information for specifying an amount of banknotes determined as genuine by the counterfeit detection. The customer is thus conveniently notified of the amount of money settled for the deposit transaction. The 'specified piece of information for specifying the amount of banknotes determined as genuine' may include only the amount of banknotes determined as genuine or may include the type and the number of banknotes determined as counterfeit, in addition to the total amount of money received. Any piece of information may be used, as long as the customer can be notified of the amount of banknotes determined as genuine.

The banknote handling device of the invention may further include an output module that outputs a form describing the information. The form to be output is, for example, a transaction statement. This desirably enables the financial institution to show the customer the details of the deposit transaction.

A second application of the invention is directed to a banknote handling device, which includes: a money-in module that receives banknotes from a customer; a safe that stores banknotes; a discrimination module that carries out counterfeit detection and determines each banknote as counterfeit or as genuine; and a collection box that stores each banknote determined as counterfeit by the counterfeit detection to be not returnable to the customer, wherein said collection box is located outside said safe.

The safe is designed extremely tough and strong to protect cash money, checks, and other valuables against thefts, robberies, disasters, and hazards. In the structure of the second application, the collection box for storing the counterfeit banknotes is located outside the safe. This facilitates collection of the counterfeit banknotes and enhances the convenience of the clerk at the financial institution.

A third application of the invention is directed to a banknote handling device, which includes: a money-in module that receives banknotes from a customer; a safe that stores banknotes; multiple banknote storage boxes that are located in said safe and store banknotes classified by a banknote type; a discrimination module that carries out counterfeit detection and determines each banknote as counterfeit or as genuine; a setting storage module that sets at least one of said multiple banknote storage boxes to a collection box, which stores each banknote determined as counterfeit by the counterfeit detection to be not returnable to the customer, and stores the setting; and a sorting control module that sorts out each banknote determined as counterfeit to said collection box, based on a result of the counterfeit detection.

When each of the banknote storage boxes has an individual serial number, the administrator of the banknote handling device may select a serial number of the banknote storage box to be set to the collection box. The banknote storage box used as the collection box for storing the counterfeit banknotes is set non-recyclable. This desirably prohibits the counterfeit banknotes from being returned to the customer.

The structure of the third application does not require installation of an exclusive collection box. This simple structure ensures collection of the banknotes determined as counterfeit.

In either of the banknote handling devices of the second and the third applications, the banknotes stored in the collection box are not restricted to the banknotes determined as counterfeit by the counterfeit detection. For example, when the banknotes received from the customer include even one banknote determined as counterfeit, all the banknotes received may be stored in the collection box. This desirably relieves the processing load of the banknote handling device.

Any of the banknote handling devices of the first through the third applications may further include a management module that manages customer information for identifying each customer who handles a transaction. The management module maps the presence or absence of any counterfeit banknote involved in the transaction to the customer information. This conveniently assures identification of the customer who has possessed the counterfeit banknotes.

The management module may further map each banknote involved in the transaction to the customer information. This arrangement desirably ensures identification of the customer who has possessed and tried to use the counterfeit banknotes, thus preferably deters circulation of the counterfeit banknotes.

The characteristics of the banknote handling devices discussed above may be combined adequately. The technique of the invention is not restricted to the banknote handling device, but is actualized by a variety of other applications including a banknote management method that manages and controls the sorting of the banknotes discussed above.

DESCRIPTION OF THE EMBODIMENTS

Figure 1:
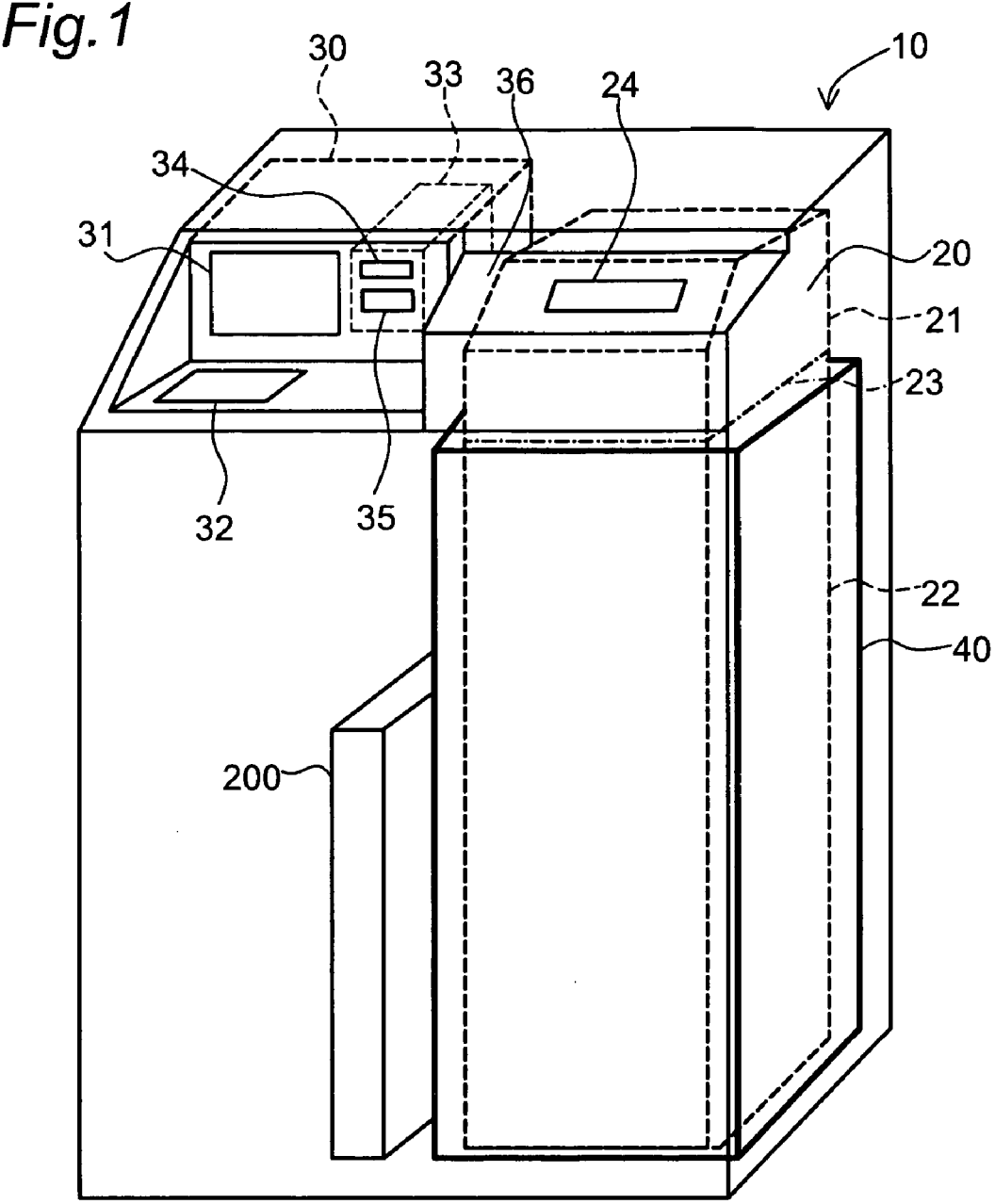
FIG. 1 illustrates the system construction of an automatic teller machine in a first embodiment of the invention.

Some embodiments of the present invention are discussed below in the following sequence:

A. First Embodiment
   A1. System Construction
   A2. Banknote Handling Mechanism
   A3. Functional Blocks
   A4. Money-In Process
   A5. Message Window
   A6. Transaction Statement
B. Second Embodiment
   B1. Banknote Handling Mechanism
   B2. Money-In Process
C. Third Embodiment
   C1. Banknote Storage Box
   C2. Money-In Process
D. Modifications A. First Embodiment A1. System Construction FIG. 1 illustrates the system construction of an automatic teller machine 10 in a first embodiment of the invention. The automatic teller machine is located in banks and other financial institutions for automated transactions in response to customers' operations. The transactions include deposits to customers' accounts, withdrawals from customers' accounts, and transfers to other accounts. This embodiment especially regards a series of processing executed when banknotes paid in for a deposit transaction include some counterfeits.

The automatic teller machine 10 of this embodiment has a banknote handling mechanism 20, a transaction processing assembly 30, and a control unit 200.

The banknote handling mechanism 20 has a money in/out module 21 above a one-dot chain line 23 and a banknote storage module 22 below the one-dot chain line 23. The money in/out module 21 has a cover 36. For the security, the banknote storage module 22 that stores cash money is located inside a safe 40. Banknotes are received from and given to each customer through a banknote in-out slot 24 formed in the cover 36. In a deposit transaction, when the customer inserts banknotes into the banknote in-out slot 24, the money in/out module 21 discriminates counterfeit or counterfeit banknotes from genuine banknotes, classifies the genuine banknotes by the banknote type, and stores the classified genuine banknotes in the banknote storage module 22. The counterfeit banknotes are collected in a counterfeit collection box (discussed later). In a withdrawal transaction, banknotes corresponding to the customer's specified amount of money are withdrawn from the banknote storage module 22 and are given to the customer through the banknote in-out slot 24. The counterfeit banknotes collected in the counterfeit collection box are not mistakenly returned to the customer or used for withdrawal transactions.

The transaction processing assembly 30 includes a display panel 31, an input unit 32, and a medium processing module 33. The display panel 31 gives display of information and a message relating to a current transaction to the customer. The input unit 32 functions as an interface to be manipulated for the transaction and has push button switches in the structure of this embodiment. Although the display panel 31 is separate from the input unit 32 in the structure of this embodiment, the display panel 31 may alternatively be structured as a touch panel and be integrated with the input unit 32.

The medium processing module 33 has a card slot 34 and a form acceptance unit 35 and acquires customer information regarding each customer who requires a transaction from any of various cards inserted in the card slot 34 and passbooks inserted in the form acceptance unit 35. The customer information includes, for example, an account number for identifying the account of the customer and a secret identification code. The card may be any of ATM cards, credit cards, and IC cards. The medium processing module 33 functions to output a transaction statement showing written results of each transaction and to print the details of the transaction on the customer's passbook, in addition to acquisition of the customer information.

The operations of the respective units included in the automatic teller machine 10 discussed above are under control of the control unit 200. The control unit 200 is constructed as a microcomputer including a CPU and memories and receives and sends information from and to these units to control the operations of the whole automatic teller machine 10.

A2. Banknote Handling Mechanism

Figure 2:
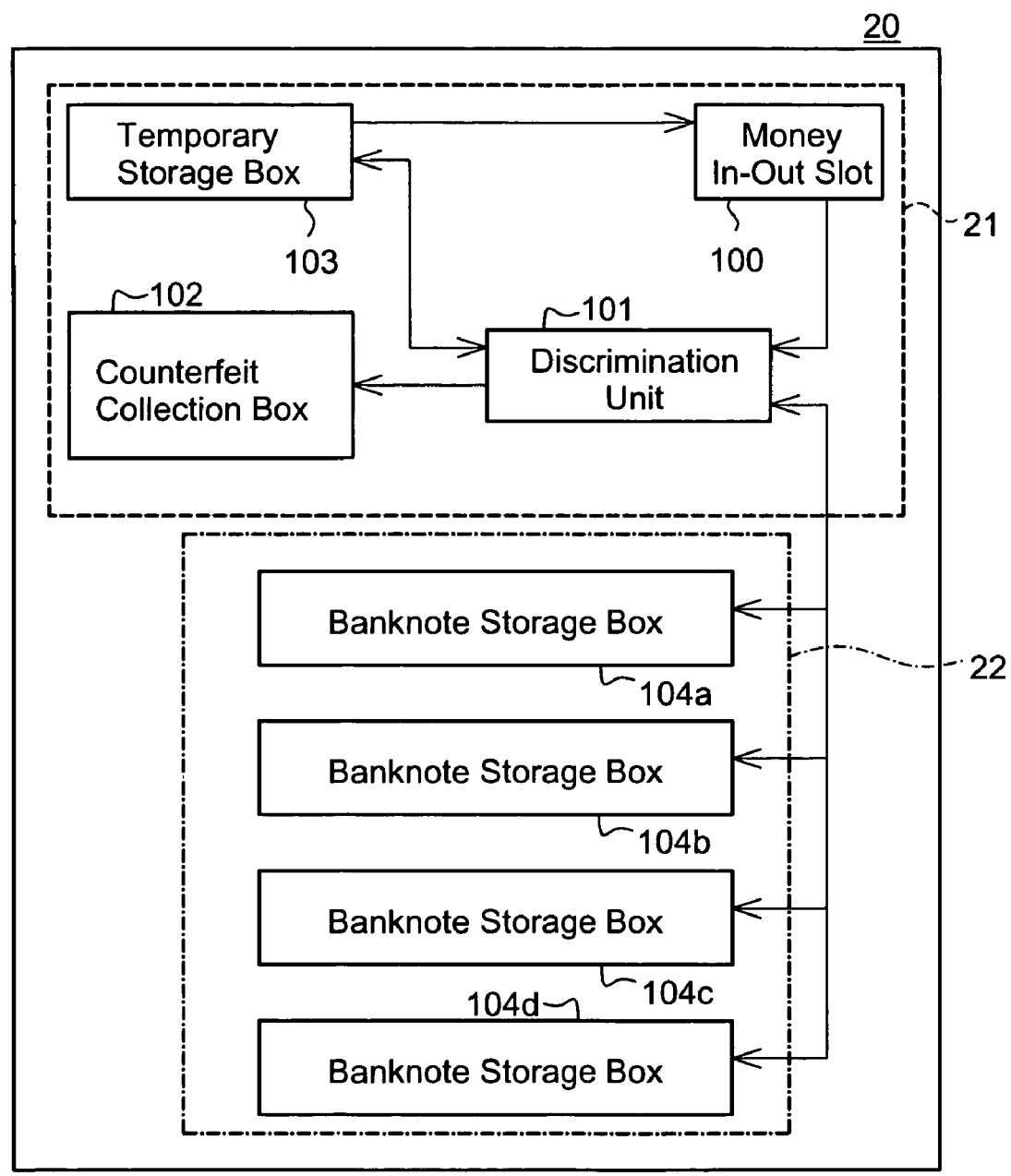
FIG. 2 schematically illustrates the structure of a banknote handling mechanism included in the automatic teller machine of the first embodiment.

FIG. 2 schematically illustrates the structure of the banknote handling mechanism 20. The banknote handling mechanism 20 has the money in/out module 21 and the banknote storage module 22 as discussed above. The arrows in the illustration show a banknote conveyor path, which interconnects respective units for conveyance of banknotes. The banknotes are flown in the direction of the arrows. The following description regards the processing executed by the respective units in the process of a deposit transaction.

The money in/out module 21 has a money in-out slot 100, a counterfeit detection unit 101, a counterfeit collection box 102, and a temporary storage box 103. The banknote storage module 22 has four banknote storage boxes 104*a*, 104*b*, 104*c*, and 104*d* for storing banknotes classified by the banknote type. In the structure of this embodiment, 10000 yen bills and 5000 yen bills are respectively stored in the banknote storage box 104*a* and in the banknote storage box 104*b*, while 1000 yen bills are stored in both the banknote storage boxes 104*c* and 104*d*.

Banknotes are received from and given to each customer via the money in-out slot 100. The banknotes inserted into the money in-out slot 100 at the time of a deposit transaction are separately conveyed to the counterfeit detection unit 101. The counterfeit detection unit 101 functions to carry out counterfeit detection and determine each banknote as counterfeit or as genuine. The banknotes determined as counterfeit by the counterfeit detection unit 101 are collected into the counterfeit collection box 102. The counterfeit collection box 102 is designed to prohibit the collected counterfeit banknotes from being returned to the customer.

The banknotes determined as genuine by the counterfeit detection unit 101 are temporarily kept in the temporary storage box 103 until settlement of the current transaction, and are conveyed to the banknote storage module 22 in response to the customer's deposit instruction. When the customer gives a cancellation instruction of the current transaction, the banknotes temporarily kept in the temporary storage box 103 are returned to the customer through the money in-out slot 100. No counterfeit banknotes collected in the counterfeit collection box 102 are returned to the customer, so that only the banknotes determined as genuine among the banknotes received from the customer are returned to the customer. In the case of counterfeit detection, information showing that the non-returned banknotes are counterfeit is displayed on the display panel 31 and is described in a transaction statement given to the customer. This notifies the customer of the reason of inconsistency between the paid-in banknotes and the paid-back banknotes.

A3. Functional Blocks

Figure 3:
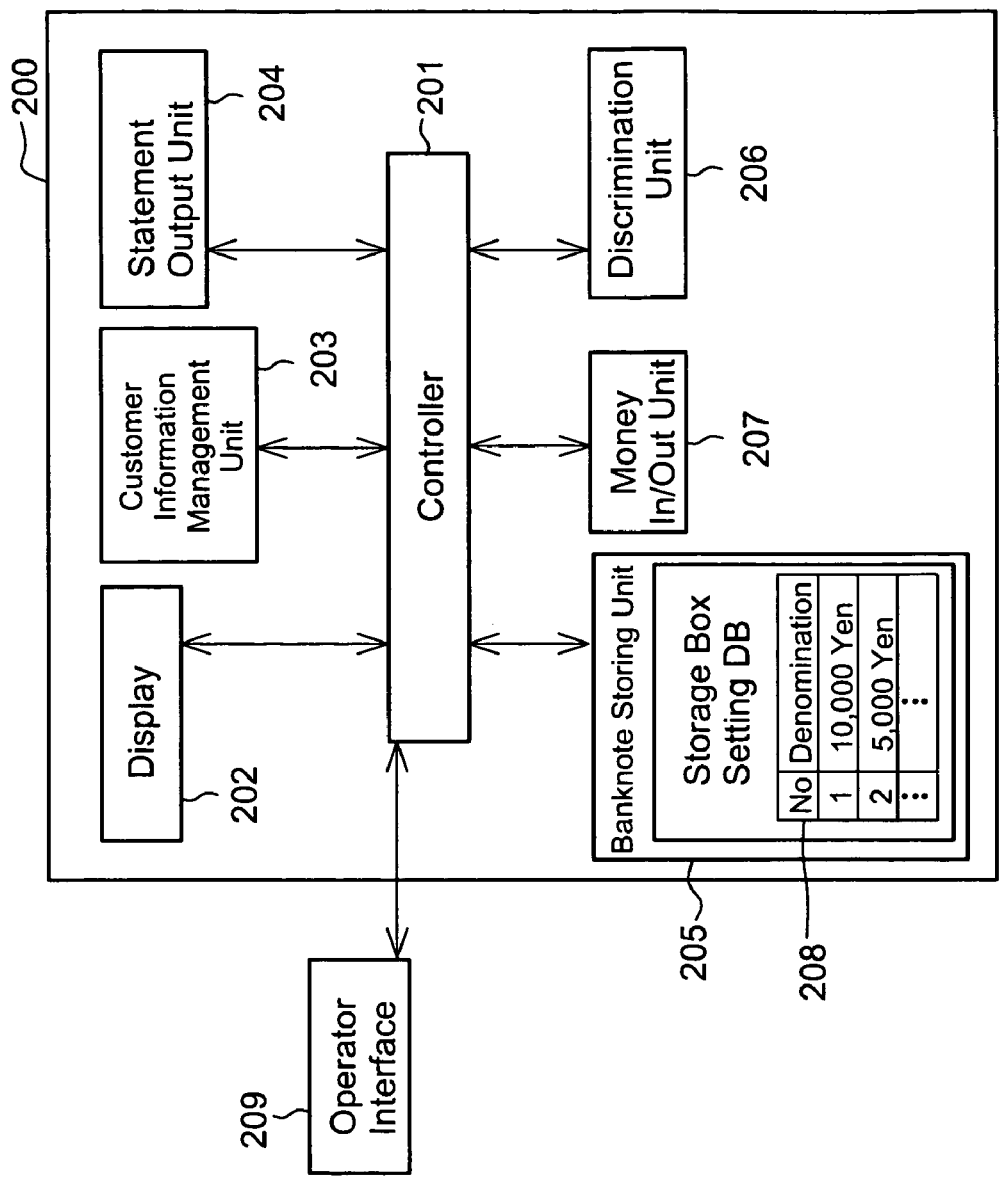
FIG. 3 is a functional block diagram of a control unit in the automatic teller machine of the first embodiment.

FIG. 3 shows functional blocks of the control unit 200 involved in the deposit transaction. In this embodiment, the respective functional blocks are attained by the software configuration in the control unit 200 and are controlled by a controller 201. The respective functional blocks may alternatively be actualized by the hardware construction.

The control unit 200 includes a controller 201, a display 202, a customer information management unit 203, a statement output unit 204, a banknote sorting unit 205, a banknote discrimination unit 206, a money in/out unit 207, and a storage box setting DB (database) 208 incorporated in the banknote sorting unit 205.

The controller 201 controls the other functional blocks included in the control unit 200, while controlling conveyance of banknotes and operations of the respective storage boxes, that is, the banknote storage boxes 104*a* to 104*d*, the counterfeit collection box 102, and the temporary storage box 103.

The display 202 functions to generate and output information, which is to be displayed on the display panel 31. In this embodiment, the information to be displayed includes the total amount of money received from the customer, the types of the banknotes received and their numbers, the number of genuine banknotes, and the amount of money settled as the deposit transaction. The customer information management unit 203 receives customer information regarding the customer who handles the transaction from a card and a passbook inserted into the medium processing module 33. The statement output unit 204 prints the details of the transaction on a form and outputs the printed form. In the case of a deposit transaction, the details of the transaction to be printed include the date of the transaction, the name of the customer, the account number, the specification of the transaction, the amount of money received, the results of counterfeit detection of the banknotes received from the customer, and the amount of money settled as the deposit transaction.

The money in/out unit 207 detects insertion of banknotes into the money in-out slot 100. In response to detection of banknotes by the money in/out unit 207, the controller 201 conveys the banknotes to the banknote discrimination unit 206. The banknote discrimination unit 206 determines each banknote as genuine or counterfeit, specifies the banknote type and the damage status of each banknote, and keeps the results of discrimination. The banknote discrimination unit 206 also counts up the number of each type of banknotes and keeps the results of counting, in addition to the results of discrimination (hereafter these results are collectively referred to as the results of discrimination).

The banknote sorting unit 205 refers to the storage box setting DB 208 and sorts out the respective banknotes, based on the results of discrimination kept in the banknote discrimination unit 206 and the contents of the storage box setting DB 208. The banknote sorting unit 205 gives a conveyance instruction to the controller 201 to convey the banknotes according to the results of sorting. The controller 201 receives the conveyance instruction and conveys and stores the banknotes.

The storage box setting DB 208 is constructed as part of the banknote sorting unit 205, and manages the mapping of the number allocated to each storage box to the type of the banknotes to be stored in the storage box, which is stored in the form of a table. The numeral '0' is allocated to the counterfeit collection box 102. The numerals '1, 2, 3, . . . ' are sequentially allocated to the banknote storage boxes according to their locations in the banknote storage module 22. For example, in the structure of this embodiment, the numeral '1' is given to the banknote storage box 104*a*, and the numeral '2' to the banknote storage box 104*b*.

An operator interface 209 is provided on the rear face of the banknote handling mechanism 20 and functions to effectuate the settings in the storage box setting DB 208 via the controller 201. For example, the operator may specify '1000 yen' as the banknote type to be stored in the banknote storage box 104*a* having the numeral '1' allocated thereto. The operator can flexibly change the settings in the storage box setting DB 208 according to the requirements.

A4. Money-In Process

Figure 4:
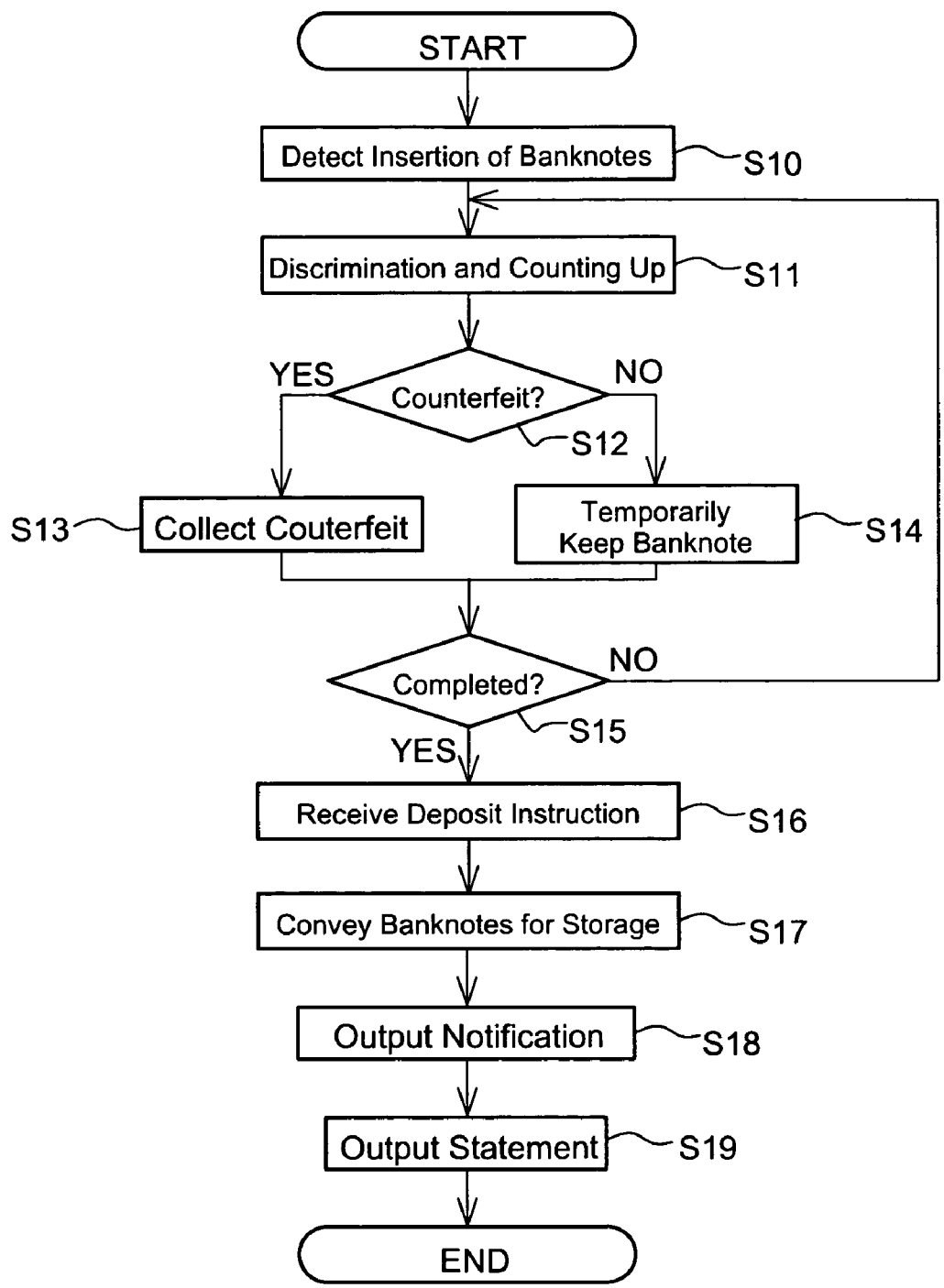
FIG. 4 is a flowchart showing a money-in routine executed in the first embodiment.

FIG. 4 is a flowchart showing a money-in routine executed in the first embodiment. The following description regards a series of processing when the banknotes received from a customer include any counterfeit banknote. The controller 201 controls the respective functional blocks to execute this money-in routine. The money-in routine starts when banknotes are inserted into the money in-out slot 100.

The control unit 200 detects insertion of banknotes (step S10), separates the paid-in banknotes one by one, discriminates each banknote, and counts up the number of each type of banknotes (step S11). The control unit 200 determines each banknote as genuine or as counterfeit (step S12). When the banknote is determined as counterfeit, the counterfeit banknote is collected in the counterfeit collection box 102 (step S13). When the banknote is determined as genuine, the genuine banknote is temporarily kept in the temporary storage box 103 (step S14). In this manner, the control unit 200 sorts out the banknotes to the corresponding destinations for storage according to the results of discrimination.

The control unit 200 subsequently determines whether all the paid-in banknotes have been sorted out (step S15). When the sorting has not yet been completed, the control unit 200 returns the processing to step S11 to discriminate a next banknote. When the sorting has been completed, on the other hand, the control unit 200 receives the customer's deposit instruction (step S16) and conveys the banknotes temporarily kept in the temporary storage box 103 to be stored in the corresponding banknote storage boxes 104a to 104d (step S17).

On completion of storage of the banknotes, the control unit 200 notifies the customer of the information regarding the deposit transaction in the form of a message window on the display panel 31 (step S18). The information includes the total amount of money received from the customer, the number of banknotes determined as genuine among the banknotes received from the customer, and the amount of money settled as the deposit transaction. The control unit 200 also outputs a transaction statement (step S19) and concludes the deposit transaction.

A5. Message Window

The following describes the message window given to the customer as a display on the display panel 31 (step S18 in the flowchart of FIG. 4) on conclusion of the deposit transaction.

Figure 5:
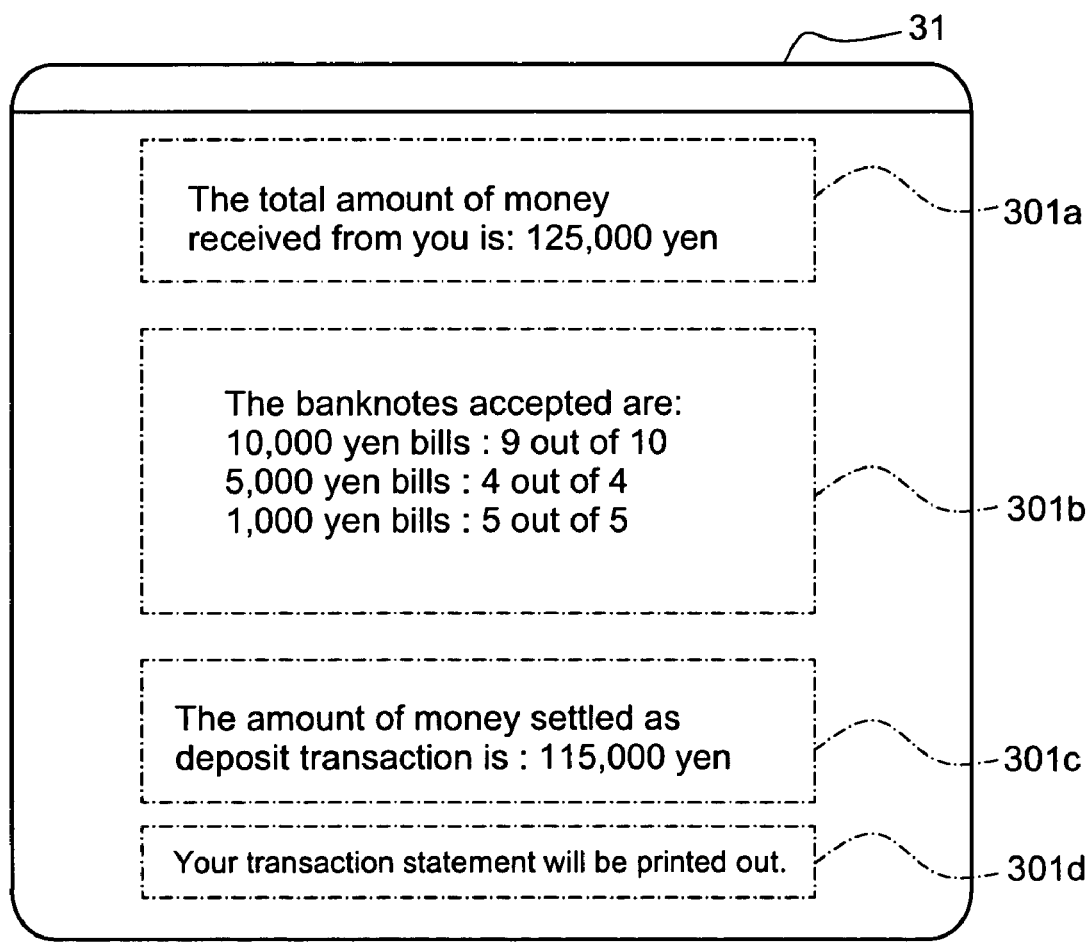
FIG. 5 shows a message window displayed on completion of a deposit transaction in the first embodiment.

FIG. 5 shows a message window displayed to notify the customer of the details of a deposit transaction on completion of the transaction. In this illustrated example, the banknotes received from the customer include a counterfeit banknote. The display on the display panel 31 includes a total amount of money received 301a, a breakdown of banknotes accepted 301b, an amount of money settled for transaction 301c, and a message 301d.

The total amount of money received 301a shows the total amount of banknotes received from the customer, whether or not the banknotes are genuine or counterfeit. The breakdown of banknotes accepted 301b shows the details of the banknotes accepted for the transaction, based on the results of the counterfeit detection of the banknotes received from the customer. In the illustrated example, the customer has paid in ten 10000 yen bills, four 5000 yen bills, and five 1000 yen bills, and the banknotes accepted for the transaction are nine 10000 yen bills, four 5000 yen bills, and five 1000 yen bills according to the results of the counterfeit detection. Namely one 10000 yen bill has been determined as counterfeit.

The amount of money settled for transaction 301c explicitly shows the amount of money settled as the deposit transaction. The message 301d suggests the customer a step to be taken. When the banknotes received include any counterfeit banknote, the customer is generally supposed to deal with the counterfeit problem at the teller. In such cases, a message like 'Please come to the teller with the transaction statement' is given to conveniently assist the customer take the required steps.

The total amount of money received 301a and the amount of money settled for transaction 301c are computable from the breakdown of banknotes accepted 301b, and may thus be omitted. The display of these pieces of information, however, conveniently enables the customer to readily grasp the total amount of money received and the amount of money settled.

A6. Transaction Statement

Figure 6:
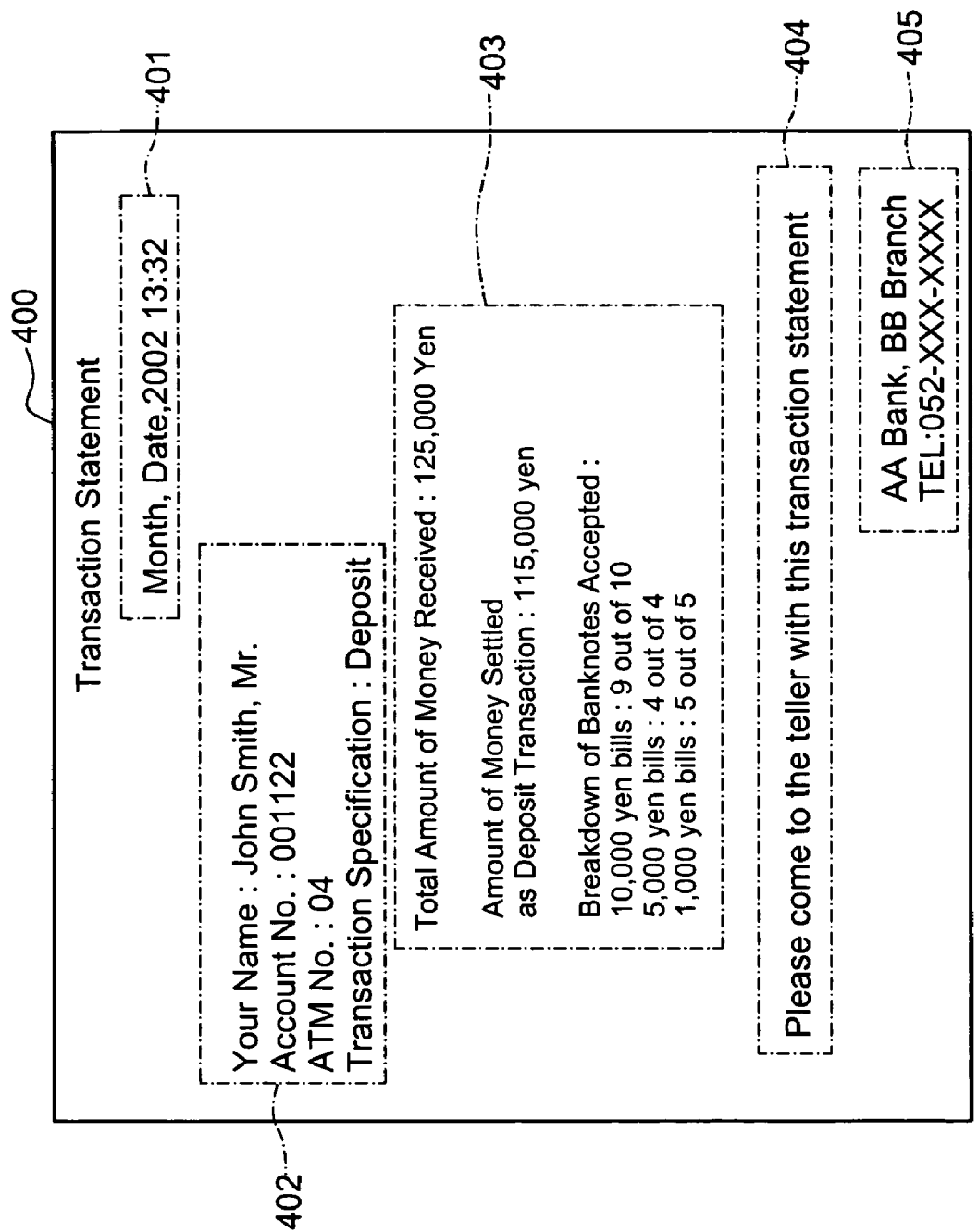
FIG. 6 shows a transaction statement issued in the first embodiment.

FIG. 6 shows a transaction statement 400, which is output at step S19 in the flowchart of FIG. 4 by the control unit 200.

The transaction statement 400 includes a transaction date/time 401, customer information 402, transaction details 403, a message 404, and financial institution information 405. The transaction date/time 401 shows the date and the time when the customer has handled the transaction. The customer information 402 includes information for identifying the customer involved in the transaction, that is, 'customer name' and 'account number', information for identifying the automatic teller machine involved in the transaction, that is, 'ATM number', and information for identifying the transaction, that is, 'specification of transaction'. In the structure of this embodiment, when the banknotes received from the customer include any counterfeit banknote, the counterfeit banknotes are collected in the counterfeit collection box 102 to be not returnable to the customer. The clerk at the financial institution checks the transaction statement 400 to readily specify the ATM where the counterfeit banknotes are collected.

The transaction details 403 show the total amount of money received from the customer, the amount of money accepted for the transaction, that is, the amount of banknotes excluding the counterfeits, and the breakdown of the banknotes accepted for the transaction. The item 'Breakdown of Banknotes Accepted' is identical with the breakdown of banknotes accepted 301b included in the message window shown in FIG. 5. The message 404 suggests the customer a step to be taken. For example, while the teller at the financial institution is open, a message like 'Please come to the teller with this transaction statement' is given. When the teller at the financial institution is closed, a message like 'Please contact the headquarters' is given with the telephone number of the headquarters. For the smoother steps of the financial institution to the counterfeit problem, a further message asking the customer to bring any ID for identification of the customer and the card used for the transaction with the transaction statement 400 may be given in addition to the message 404. The financial institution information 405 includes, for example, the name of the financial institution and the name of the branch where the transaction has been made, as well as the point of contact.

As described above, when the banknotes received from a customer include any counterfeit banknote, the automatic teller machine of the first embodiment discussed above collects the counterfeit banknotes to be not returnable to the customer. This advantageously forbids circulation of the counterfeit banknotes. The counterfeit collection box for storing the counterfeit banknotes is located outside the safe. This enables the financial institution to efficiently deal with the counterfeit banknotes. The customer is notified of the fact that the counterfeit banknotes have been excluded from the deposit transaction and thus conveniently recognizes the presence of any counterfeit banknote among the banknotes paid into the automatic teller machine. The output of the transaction statement describing inclusion of any counterfeit banknote in the banknotes received proves the details of the transaction demanded by the customer and helps the customer and the financial institution take action on the counterfeit problem.

B. Second Embodiment

The structure of the first embodiment places the counterfeit collection box for storing the counterfeit banknotes outside the safe. The structure of a second embodiment sets part of multiple banknote storage boxes included in a banknote storage module to a counterfeit collection box and maps each counterfeit banknote to the customer who has paid in the counterfeit banknote. The transaction processing assembly 30 and the control unit 200 in the second embodiment have similar structures to those of the first embodiment.

B1. Banknote Handling Mechanism

Figure 7:
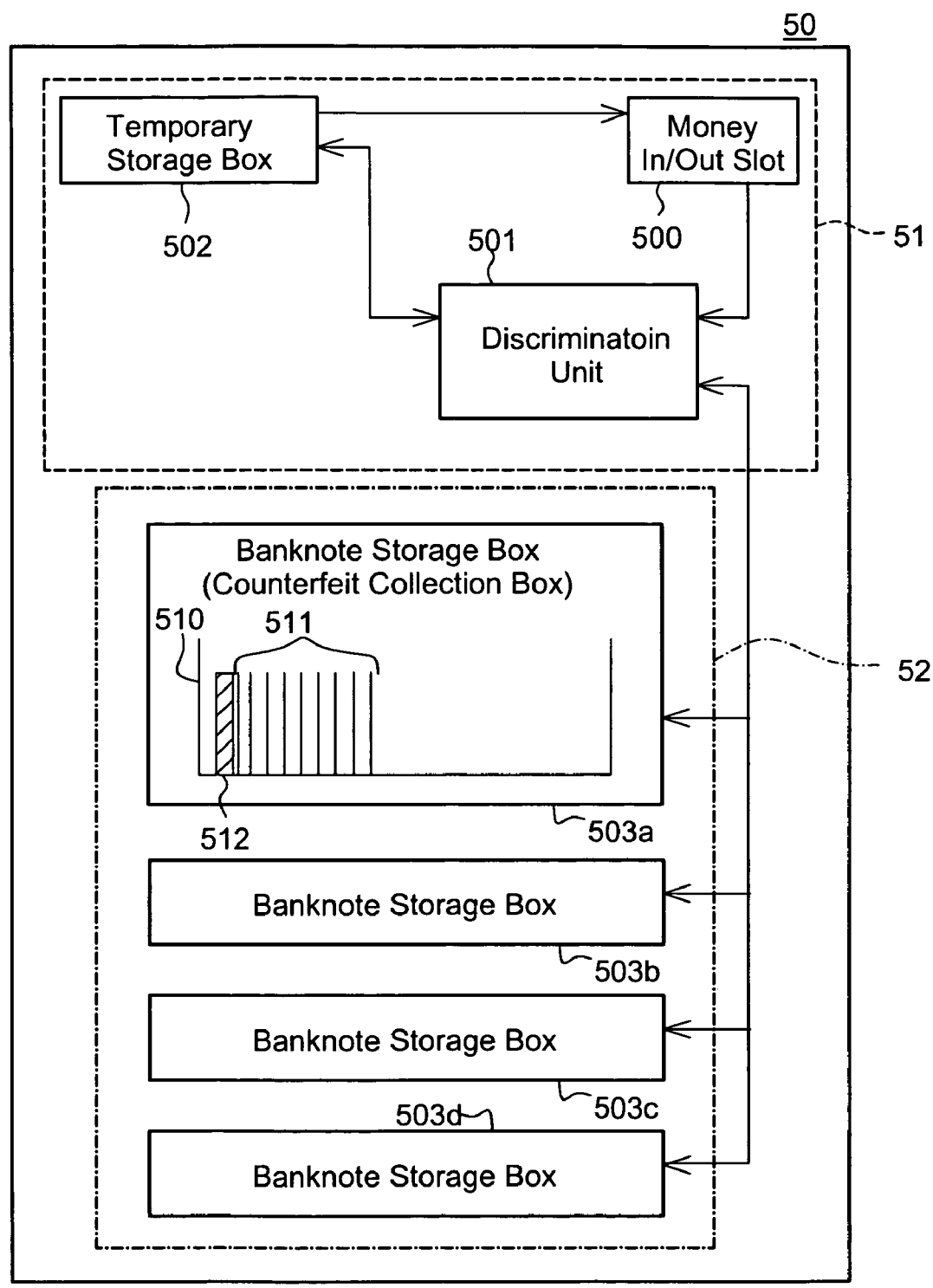
FIG. 7 schematically illustrates the structure of a banknote handling mechanism in a second embodiment.

FIG. 7 schematically illustrates the structure of a banknote handling mechanism 50 in the automatic teller machine of the second embodiment. The banknote handling mechanism 50 does not have a counterfeit collection box in a money in/out module 51 but sets one of multiple banknote storage boxes 503a to 503d included in a banknote storage module 52 to a counterfeit collection box. As discussed above in the first embodiment with reference to FIG. 3, the operator interface 209 is manipulated to change the settings of the storage box setting DB 208. The settings of the storage box setting DB 208 determine which of the banknote storage boxes 503a through 503d should store genuine banknotes or counterfeit banknotes. In the structure of the second embodiment, the banknote storage box 503a with setting of a numeral '1' is supposed to collect counterfeit banknotes. This banknote storage box 503a is hereafter referred to as the counterfeit collection box 503a.

Banknotes are received from and given to each customer via a money in-out slot 500. The banknotes inserted into the money in-out slot 500 at the time of a deposit transaction are separately conveyed to a counterfeit detection unit 501. The counterfeit detection unit 501 functions to carry out counterfeit detection and determine each banknote conveyed from the money in-out slot 500 as counterfeit or as genuine. All the banknotes subjected to the counterfeit detection by the counterfeit detection unit 501 are temporarily kept in a temporary storage box 502, regardless of the results of the counterfeit detection, and are fed to a banknote storage module 52 in response to the customer's deposit instruction.

The banknote storage box 503a set as the counterfeit collection box has a reservation box 510, in which conveyed counterfeit banknotes are successively aligned for storage as counterfeit banknotes 511. The reservation box 510 has a supporting fixture 512 to support alignment of the counterfeit banknotes 511. The supporting fixture 512 is designed to be movable backward, where the inlet of the banknote storage box is specified as the front side (the right side in the illustration) and the opposite is specified as the back side (the left side). When newly found counterfeit banknotes are conveyed into the reservation box 510, the supporting fixture is moved backward to align the conveyed counterfeit banknotes with the existing counterfeit banknotes 511 for storage. This structure is also applied to the other banknote storage boxes 503b to 503d. The banknotes are classified by the banknote type for alignment and storage.

B2. Money-In Process

Figure 8:
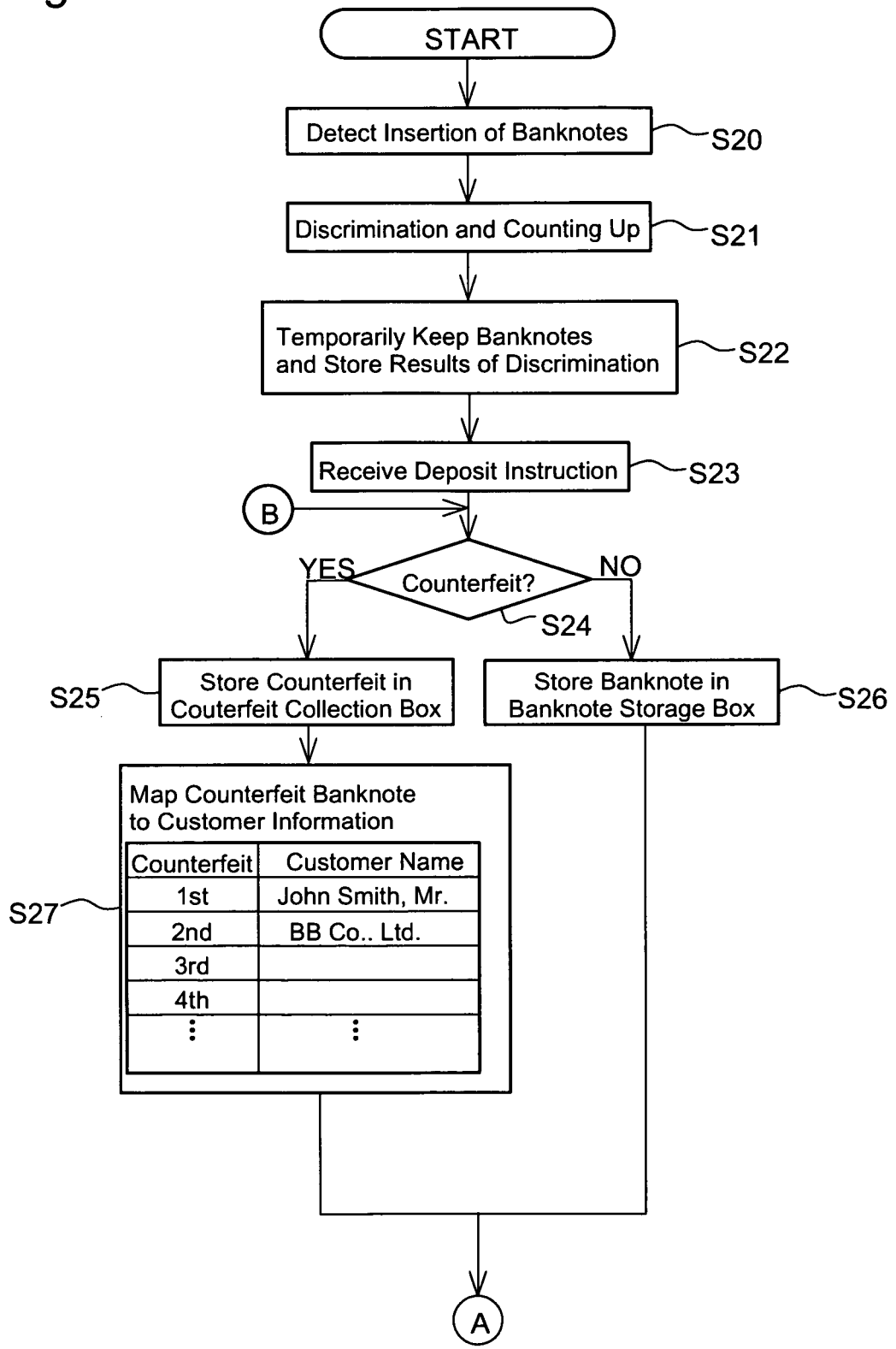
FIG. 8 is a flowchart showing a money-in routine executed in the second embodiment.
Figure 9:
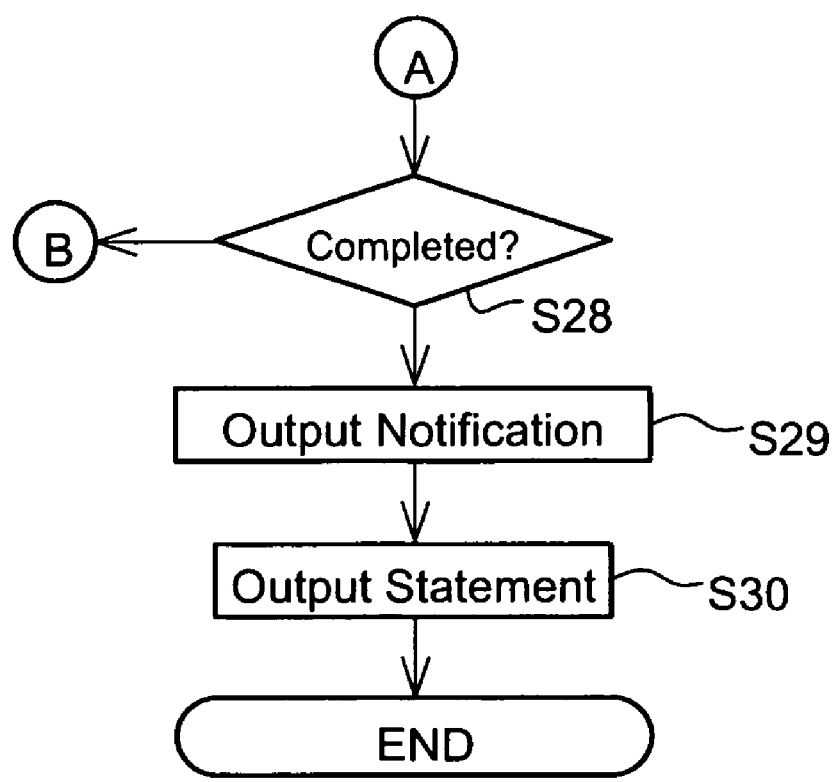
FIG. 9 is a flowchart showing the money-in routine executed in the second embodiment.

FIGS. 8 and 9 are flowcharts showing a money-in routine executed in the second embodiment. The following description regards a series of processing when the banknotes received from a customer include any counterfeit banknote. The processing stores each counterfeit banknote in the counterfeit collection box and maps the counterfeit banknote to the customer information on the customer who has paid in the counterfeit banknote. The controller 201 controls the respective functional blocks to execute this money-in routine. The money-in routine starts when banknotes are inserted into the money in-out slot 500.

The control unit 200 detects insertion of banknotes (step S20), separates the paid-in banknotes one by one, discriminates each banknote, and counts up the number of each type of banknotes (step S21). The control unit 200 stores the results of the discrimination and temporarily keeps all the banknotes in the temporary storage box 502, regardless of the results of the discrimination (step S22).

After temporary storage of all the banknotes in the temporary storage box 502, the control unit 200 receives the customer's deposit instruction (step S23) and carries out counterfeit detection to determine each banknote in the temporary storage box 502 as counterfeit or as genuine (step S24). When the banknote is determined as counterfeit, the control unit 200 collects the banknote into the counterfeit collection box 503a (step S25) and maps the counterfeit banknote to the customer information on the customer who has tried to pay in the counterfeit banknote (step S27). The control unit 200 maps each counterfeit banknote stored in the counterfeit collection box 503a to the customer information on the customer who has possessed the tried to pay in the counterfeit for the transaction, in the form of a table as illustrated. The illustrated table shows that a first counterfeit banknote stored in the counterfeit collection box 503a has been paid in by a customer 'John Smith, Mr.' and that second through fifth counterfeit banknotes have been paid in by a customer 'BB Co., Ltd'. The table may include another piece of information, for example, the account number, instead of the customer name. When the banknote is determined as genuine, the control unit 200 stores the banknote into one of the banknote storage boxes 503b to 503d corresponding to the specified banknote type (step S26).

The control unit 200 then determines whether or not there is any banknote in the temporary storage box 502 to specify conclusion of the storage process (step S28). In the case of non-conclusion, that is, when there is any banknote in the temporary storage box 502, the control unit 200 returns the processing to step S24 to carry out counterfeit detection of a next banknote. In the case of conclusion, that is, when there is no banknote in the temporary storage box 502, on the other hand, the control unit 200 notifies the customer of the details of the current transaction as a display on the display panel 31 (step S29) and outputs a transaction statement (step S30). The control unit 200 then exits from this money-in routine.

In the automatic teller machine of the second embodiment discussed above, part of the existing banknote storage boxes is set to the counterfeit collection box. This facilitates setting of the counterfeit collection box. The technique of the second embodiment maps each counterfeit banknote to the customer information on the customer who has possessed and tried to pay in the counterfeit banknote. When any counterfeit banknote is found, this management strategy conveniently helps the financial institution take prompt action on the counterfeit problem.

C. Third Embodiment

The procedures of the first embodiment and the second embodiment sorts out the respective banknotes received from the customer for storage. The procedure of a third embodiment does not classify the banknotes received from the customer by the banknote type but collectively stores all the types of banknotes together. The system construction of the third embodiment is similar to that of the second embodiment, except that all the types of banknotes received from the customer are collectively stored in the banknote storage box. In the following discussion, all the banknotes received from a customer for one transaction are collectively referred to as 'banknotes in transaction'. When the banknotes in transaction include any counterfeit banknote, the structure of the third embodiment stores the banknotes in transaction in the counterfeit collection box 503a as described below.

C1. Banknote Storage Box

Figure 10A:
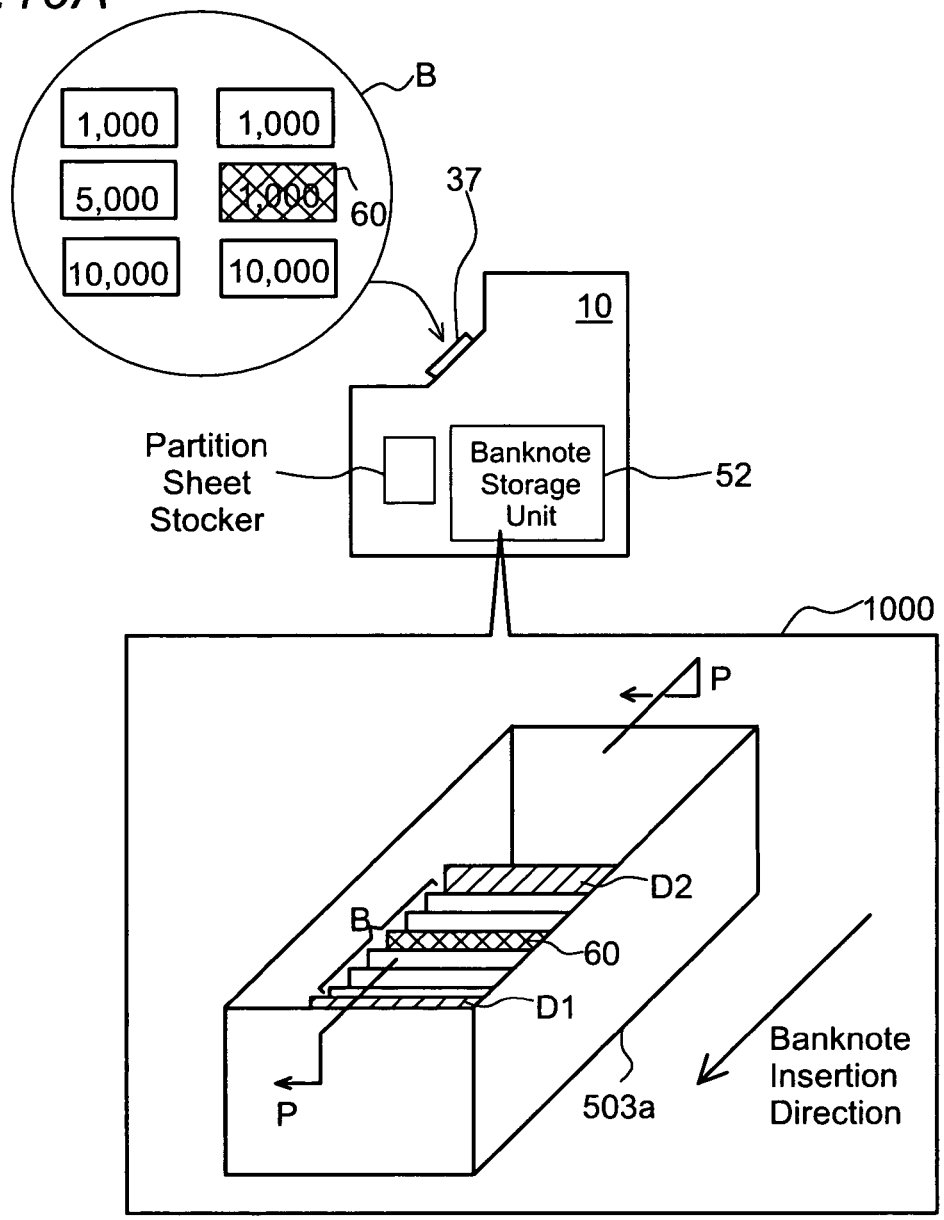
FIG. 10A and 10B schematically show a method of storing banknotes in transaction in a third embodiment.

FIG. 10A schematically shows a method of storing the banknotes in transaction. A circle B shows six banknotes inserted into the money in/out module 51 by the customer and includes two 1000 yen bills, one 5000 yen bills, two 10000 yen bills, which are all genuine, and one counterfeit 60 of 1000-yen bill, which is highlighted by hatching. In the description hereafter, these six banknotes are collectively referred to as 'banknotes in transaction B'. The control unit 200 detects insertion of the banknotes in transaction B, carries out counterfeit detection to discriminate counterfeit banknotes from genuine banknotes, and conveys the banknotes in transaction B to the banknote storage module 52 for storage. The banknotes in transaction B include the counterfeit 60 and are thus conveyed to the counterfeit collection box 503a for storage.

The structure of the counterfeit collection box 503a is shown in its perspective view 1000. As illustrated, the banknotes in transaction B including the counterfeit 60 are stored in the counterfeit collection box 503a. The banknotes in transaction B are parted from other sets of banknotes in transaction by partition sheets D1 and D2. The partition sheet D2 is inserted on the upstream side of the banknotes in transaction B in the banknote insertion direction, while the partition sheet D1 is inserted on the downstream side. These partition sheets are kept in a partition sheet stocker 70, and the control unit 200 inserts the partition sheets when required. In the structure of this embodiment, the control unit 200 inserts the partition sheet D2 after storage of the banknotes in transaction B. This structure is applied to the other banknote storage boxes 503b through 503d.

Figure 10B:
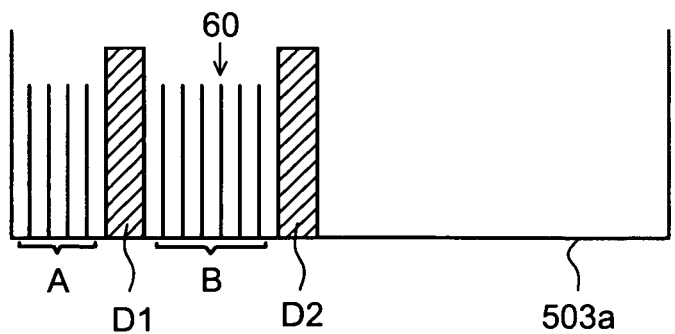

FIG. 10B is a sectional view taken on an arrow P in the perspective view 1000 of FIG. 10A. As illustrated, the banknotes in transaction B including the counterfeit 60 are aligned for storage. The partition sheet D1 parts the banknotes in transaction B from banknotes in transaction A, which have stored previously.

C2. Money-In Process

Figure 11:
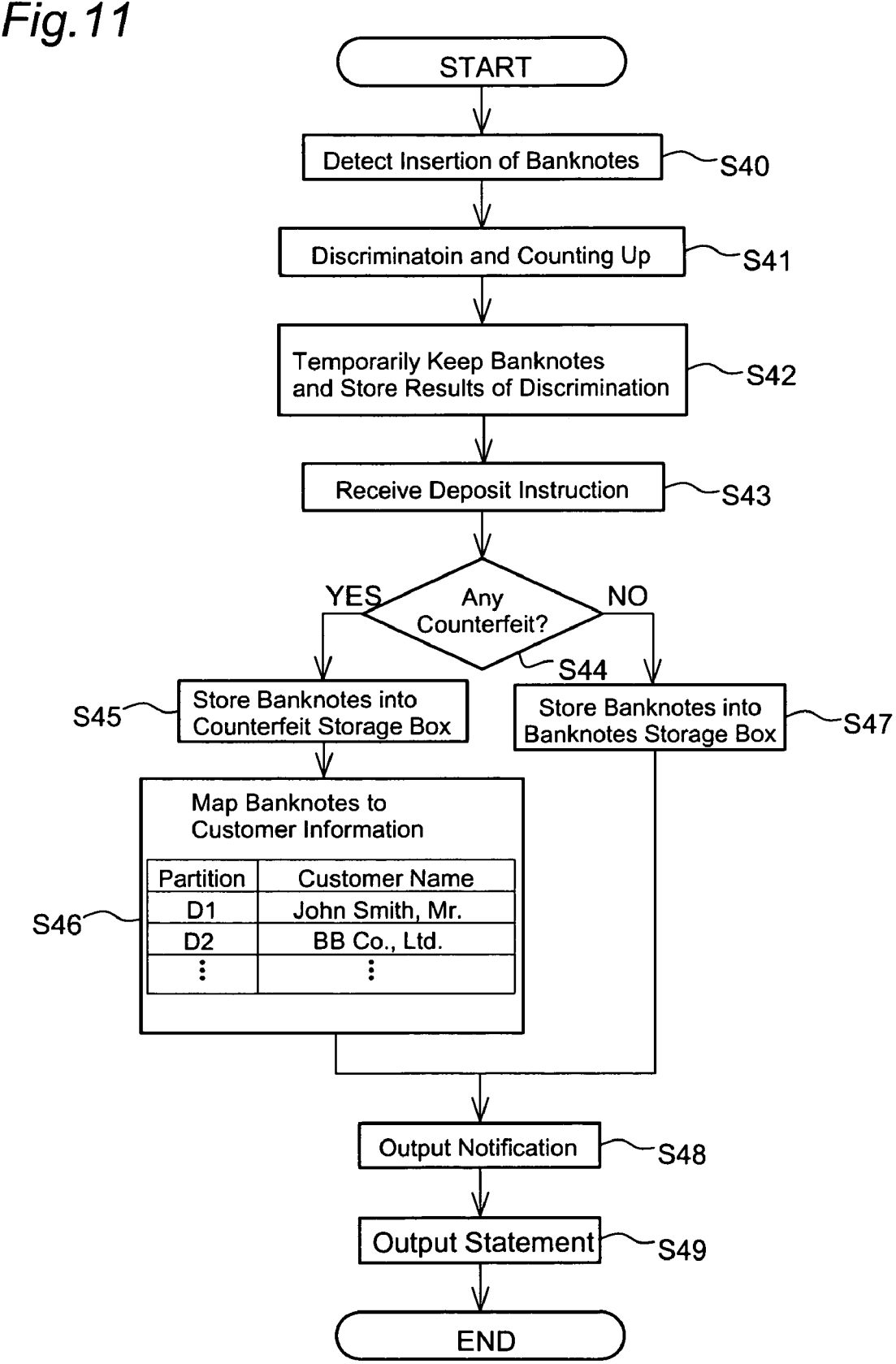
FIG. 11 is a flowchart showing a money-in routine executed in the third embodiment.

FIG. 11 is a flowchart showing a money-in routine executed in the third embodiment. The following description regards a series of processing when the banknotes in transaction include any counterfeit banknote. The processing stores all the banknotes in transaction including counterfeit in the counterfeit collection box and maps such banknotes in transaction to the customer information on the customer who has paid in these banknotes in transaction. The controller 201 controls the respective functional blocks to execute this money-in routine. The money-in routine starts when banknotes are inserted into the money in-out slot 500. The processing of steps S40 to S43 is similar to the processing of steps S20 to S23 of the second embodiment in the flowchart of FIG. 8. The processing of and after step S44 is thus described below.

The control unit 200 determines whether the banknotes in transaction include any counterfeit banknote (step S44). When all the banknotes in transaction are genuine, these banknotes in transaction are stored sequentially in one of the banknote storage boxes 503b to 503d (step S47). When any counterfeit banknote is included in the banknotes in transaction, all the banknotes in transaction are stored in the counterfeit collection box 503a (step S45), and maps these banknotes in transaction to the customer information on the customer who has paid in these banknotes in transaction, in the form of a table as illustrated (step S46). The illustrated table provided at step S46 shows that the banknotes in transaction A to the partition sheet D1 have been paid in by the customer 'John Smith, Mr.' and that the banknotes in transaction B between the partition sheet D1 and the partition sheet D2 have been paid in by the customer 'BB Co., Ltd'.

On completion of storage of the banknotes in transaction, the control unit 200 notifies the customer of the details of the current transaction as a display on the display panel 31 (step S48) and outputs a transaction statement (step S49). The control unit 200 then exits from this money-in routine.

As described above, the automatic teller machine of the third embodiment collectively handles the bundle of the banknotes paid in for one transaction by each customer. This accelerates the proceeding of the transaction and ensures convenient management of the mapping of the banknotes in transaction to the customer information.

D. Modifications

D1. Modified Example 1

In the first and the second embodiments of the invention, when the presence of counterfeit banknotes is detected in the course of a deposit transaction, only the genuine banknotes may be returned to the customer in response to the customer's instruction of canceling the current deposit transaction. Alternatively all the banknotes including genuine ones may not be returned to the customer. In any case, the counterfeit banknotes must not be returned to the customer, in order to forbid circulation of counterfeit banknotes.

D2. Modified Example 2

In the first embodiment of the invention, the message window shown in FIG. 5 may not describe the breakdown of banknotes accepted but may give a message like 'There is a machine trouble'. Such modification relieves the bewilderment of the customer who does not know the possession of any counterfeit banknote, when only nine out of ten 10000 yen bills are accepted for the deposit transaction. In this case, some secret number representing the counterfeit problem is written in the transaction statement. This conveniently helps the financial institute take prompt action on the counterfeit problem.

D3. Modified Example 3

In the first through the third embodiments of the invention, when the banknotes received from the customer include any counterfeit banknote, only the counterfeit banknotes are collected to be not returnable. One possible modification may not return the card or the passbook of the customer who handles the transaction.

D4. Modified Example 4

The details of the transaction printed in the transaction statement may be stored in the IC card or may be transmitted to a host computer. The card may be invalidated until the counterfeit problem is settled, and the invalidity of the card may be proclaimed in the transaction statement. This ensures the stricter supervision of the customer who has tried to pay in counterfeit banknotes.

The above embodiments and their modified examples are to be considered in all aspects as illustrative and not restrictive. There may be many modifications, changes, and alterations without departing from the scope or spirit of the main characteristics of the present invention. All changes within the meaning and range of equivalency of the claims are therefore intended to be embraced therein.

As described above, when any counterfeit banknote is included in the banknotes paid into the automatic teller machine by a customer, the technique of the invention forcibly collects the counterfeit banknotes to be not returnable to the customer. This advantageously forbids circulation of the counterfeit banknotes. The customer is notified of the fact that the banknotes received include any counterfeit banknote, and thus conveniently recognizes the reason why the transaction is against the customer's demand. The information corresponding to the notified details is written in the output of the transaction statement. This helps the customer and the financial institution take prompt action on the counterfeit problem.

What is claimed is:

1. A banknote handling device that handles banknotes, said banknote handling device comprising:
    a money-in module that receives banknotes from a customer;
    a counterfeit collection box that stores counterfeit banknotes;
    a discrimination module that carries out counterfeit detection and determines each banknote as counterfeit or as genuine;
    a counterfeit processing module that stores each banknote determined as counterfeit into said counterfeit collection box, based on a result of the counterfeit detection by said discrimination module, and prohibits the stored counterfeit banknote from being returned to the customer; and
    a notification module that notifies the customer of predetermined kind of information indicative of a total amount of money received from the customer and an amount of money settled as a transaction, regardless of the result of the counterfeit detection by said discrimination module, wherein:
    the total amount of money includes an amount of money in counterfeit notes if existing in the banknotes received from the customer and
    the predetermined kind of information notified by said notification module includes information for specifying an amount of money in banknotes determined as counterfeit by said discrimination module, out of the total amount of money received from the customer.

2. A banknote handling device in accordance with claim 1, wherein the information notified by said notification module includes information for specifying the type and number of the banknotes determined as counterfeit by said discrimination module.

3. A banknote handling device in accordance with claim 1, said banknote handling device further comprising:
    an output module that outputs a form describing the information.

4. A banknote handling device that handles banknotes, said banknote handling device comprising:
    a money-in module that receives banknotes from a customer;
    a counterfeit collection box that stores counterfeit banknotes;
    a discrimination module that carries out counterfeit detection and determines each banknote as counterfeit or as genuine;
    a counterfeit processing module that stores each banknote determined as counterfeit into said counterfeit collection box, based on a result of the counterfeit detection by said discrimination module, and prohibits the stored counterfeit banknote from being returned to the customer;
    a notification module that notifies the customer of predetermined kind of information indicative of a total amount of money received from the customer and an amount of money settled as a transaction, regardless of the result of the counterfeit detection by said discrimination module;
    a temporary storage box that temporarily keeps the banknotes received through said money-in module;
    a storage box that stores genuine banknotes; and
    a control module that temporarily keeps the received banknotes in said temporary storage box and, in response to a deposit instruction from the customer, conveys banknotes determined as genuine, among the banknotes temporarily kept in said temporary storage box, to said storage box for storage while storing any banknote determined as counterfeit in said counterfeit collection box, said control module, in response to a cancellation instruction from the customer, returning banknotes determined as genuine, among the banknotes temporarily kept in said temporary storage box, to said money-in module while storing any banknote determined as counterfeit in said counterfeit collection box, wherein:
    the total amount of money includes an amount of money in counterfeit notes if existing in the banknotes received from the customer, and
    the predetermined kind of information notified by said notification module includes information for specifying an amount of money in banknotes determined as counterfeit by said discrimination module, out of the total amount of money received from the customer.

5. A banknote handling device that handles banknotes, said banknote handling device comprising:
    a money-in module that receives banknotes from a customer;
    a counterfeit collection box that stores counterfeit banknotes;
    a discrimination module that carries out counterfeit detection and determines each banknote as counterfeit or as genuine;
    a counterfeit processing module that stores each banknote determined as counterfeit into said counterfeit collection box, based on a result of the counterfeit detection by said discrimination module, and prohibits the stored counterfeit banknote from being returned to the customer;
    a notification module that notifies the customer of predetermined kind of information indicative of a total amount of money received from the customer and an amount of money settled as a transaction, regardless of the result of the counterfeit detection by said discrimination module; and
    a management module that maps each banknote determined as counterfeit and stored in said counterfeit collection box to customer information on the customer who has paid in the banknote,
    wherein the total amount of money includes an amount of money in counterfeit notes if existing in the banknotes received from the customer.

6. A banknote handling device that handles banknotes, said banknote handling device comprising:
    a money-in module that receives banknotes from a customer;

a counterfeit collection box that stores counterfeit banknotes;

a discrimination module that carries out counterfeit detection and determines each banknote as counterfeit or as genuine;

a counterfeit processing module that stores each banknote determined as counterfeit into said counterfeit collection box, based on a result of the counterfeit detection by said discrimination module, and prohibits the stored counterfeit banknote from being returned to the customer;

a notification module that notifies the customer of predetermined kind of information indicative of a total amount of money received from the customer and an amount of money settled as a transaction, regardless of the result of the counterfeit detection by said discrimination module; and a control module that, when the banknotes received from the customer include any counterfeit banknote, stores all the banknotes including both genuine and counterfeit banknotes in said counterfeit collection box in such a manner that a bundle of banknotes received from each customer is parted from bundles of banknotes received from other customers by partition sheets, wherein the total amount of money includes an amount of money in counterfeit notes if existing in the banknotes received from the customer.

7. A banknote handling device in accordance with claim 6, said banknote handling device further comprising:

a stacker that keeps the partition sheets; and a management module that manages customer information on each customer who has paid in any counterfeit banknote, mapped to the corresponding bundle of banknotes parted by the partition sheets.

* * * * *